US011237671B1

(12) United States Patent
Wang et al.

(10) Patent No.: US 11,237,671 B1
(45) Date of Patent: Feb. 1, 2022

(54) TEMPORAL FILTER TOUCH DETECTION

(71) Applicant: Apple Inc., Cupertino, CA (US)

(72) Inventors: Lejing Wang, Sunnyvale, CA (US); Mohamed Selim Ben Himane, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 23 days.

(21) Appl. No.: 16/903,564

(22) Filed: Jun. 17, 2020

Related U.S. Application Data

(60) Provisional application No. 62/862,435, filed on Jun. 17, 2019.

(51) Int. Cl.
*G06F 3/041* (2006.01)
*G06F 3/042* (2006.01)

(52) U.S. Cl.
CPC ........ *G06F 3/04186* (2019.05); *G06F 3/0421* (2013.01)

(58) Field of Classification Search
CPC .......................... G06F 3/04186; G06F 3/0421
See application file for complete search history.

(56) References Cited

U.S. PATENT DOCUMENTS

| 7,643,011 | B2 | 1/2010 | O'Connor |
| 8,830,207 | B1 | 9/2014 | Joharapurkar |
| 9,052,771 | B2 | 6/2015 | Goertz |
| 9,626,018 | B2 | 4/2017 | Christiansson |
| 2014/0015768 | A1* | 1/2014 | Karpin ................... G06F 3/044 345/173 |

* cited by examiner

*Primary Examiner* — Afroza Chowdhury
(74) *Attorney, Agent, or Firm* — Blank Rome LLP

(57) ABSTRACT

Detecting a touch includes determining, from first raw touch data, an estimated touch type for a first plurality of frames, obtaining second raw touch data comprising a probability that a touch has occurred for each of a second plurality of frames, applying the selected filter to the additional raw data to obtain processed data, and detecting whether a touch has occurred for a particular frame based on the processed data.

20 Claims, 5 Drawing Sheets

TEMPORAL FILTER TOUCH DETECTION

BACKGROUND

This disclosure relates generally to the field of touch detection, and more specifically to the field of utilizing a temporal filter for vision-based touch detection.

Today's electronic devices provide users with many ways to interact with the world around them. For example, users may interact with electronic devices using virtual or physical keyboards, mice, trackballs, joysticks, touch screens, and the like. One way that users often interact with digital information on their device is through a touch screen interface. Touch screen interfaces allow a user to interact with a display surface using a finger, stylus, or other object. A touch sensor recognizes the area touched and provides a response to a user.

With the rise of mixed reality environments, users often provide input by additional means in order to enable virtual objects to interact with real objects. As an example, a user may touch a real object in order to interact with the real object in a mixed reality manner. However, real objects often do not include touch sensors which are traditionally utilized to detect touch from a user. What is needed is an improved manner to detect touch without a touch sensor-enabled surface.

SUMMARY

In one embodiment, a method for touch detection is described. The method may include determining, from first raw touch data, an estimated touch type for a first plurality of frames, obtaining second raw touch data comprising a probability that a touch has occurred for each of a second plurality of frames, applying the selected filter to the additional raw data to obtain processed data, and detecting whether a touch has occurred for a particular frame based on the processed data.

In another embodiment, the method may be embodied in computer executable program code and stored in a non-transitory storage device. In yet another embodiment, the method may be implemented in an electronic device.

DETAILED DESCRIPTION

Figure 1:
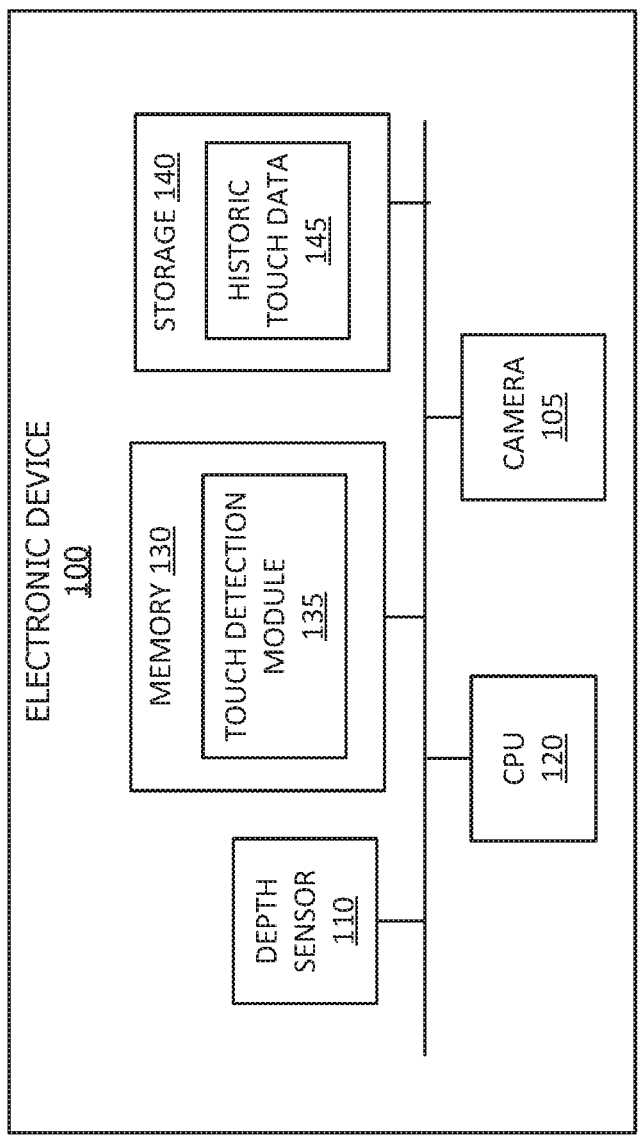
FIG. 1 shows, in block diagram form, a simplified system diagram according to one or more embodiments.

This disclosure is directed to systems, methods, and computer readable media for detecting touch in a physical environment. In general, techniques are disclosed to provide a refined technique for identifying when a user touches a surface in a physical environment using vision-based techniques. Specifically, touch data, typically indicating a likelihood of a touch at particular moments over time, may be processed by applying a particular filter, wherein the type of filter applied is based on a determined type of touch being detected over time.

According to one or more embodiments, raw touch data is obtained for an initial series of frames. The raw touch data may indicate a likelihood of a touch for each frame or a hover distance of a fingertip to a touching surface for each frame. The raw touch data may be analyzed to determine a type of touch, such as a click or a drag or a swipe. For purposes of this disclosure, a click describes an acute touch action, whereas a drag describes a sustained touch action. If a click action is detected in the initial series of frames, then for touch data from future frames, a particular filter is selected based on the touch type. In one or more embodiments, a high pass filter is utilized for a clicking touch type, and a low pass filter is utilized for a dragging touch type. The touch data may be processed utilizing the filter, and the processed touch data may be utilized to detect a touch. The processed data may be utilized to detect a touch. The touch may then be detected in any number of ways from the filtered data.

The raw touch data (e.g. touch probability or hover distance) could be obtained by a depth based touch detection. For example, depth images of a fingertip touching a real surface may be captured. A fingertip position may be detected in a depth image, and raw touch data may be determined for the fingertip position based on a finger patch containing depth pixels around the detected fingertip position. In one or more embodiments, raw touch data may be determined from the depth pixels by determining a surface in the scene, for example using random sample consensus (RANSAC) plane estimation, and estimating distances to the determined plane for each pixel in the finger patch. Then, distance estimation or classification may be performed to estimate a hover distance, or a likelihood of a touch, based on the distances to the determined plane.

In one embodiment, a touch event may be determined by applying a threshold to the raw touch data (e.g. touch probability or hover distance) from one frame. The touch event may indicate the first frame of a series of touching surface.

A break touch event can be determined by applying a break touch threshold to raw touch data (e.g., touch probability or hover distance) from one frame. The break touch event may indicate the last frame of a series of frames in which a surface is being touched. A click action may be determined when the detected touch event and break touch events are at the same position, or positions within a predetermined distance. A drag action may be determined when the detected touch event and break touch events are at different positions, or a distance apart that satisfies a predetermined threshold. The positions of touch event and break touch event could be determined in the real surface coordinate, user coordinate system or any other coordinate system. The velocity of fingertip could be computed based on fingertip position across different frames, which could be used to further distinguish between a drag action and a swipe action.

In the following description, for purposes of explanation, numerous specific details are set forth in order to provide a thorough understanding of the disclosed concepts. As part of this description, some of this disclosure's drawings represent structures and devices in block diagram form in order to avoid obscuring the novel aspects of the disclosed embodiments. In this context, it should be understood that references to numbered drawing elements without associated identifiers (e.g., 100) refer to all instances of the drawing element with identifiers (e.g., 100a and 100b). Further, as part of this description, some of this disclosure's drawings may be provided in the form of a flow diagram. The boxes in any particular flow diagram may be presented in a particular order. However, it should be understood that the particular flow of any flow diagram is used only to exemplify one embodiment. In other embodiments, any of the various components depicted in the flow diagram may be deleted, or the components may be performed in a different order, or even concurrently. In addition, other embodiments may include additional steps not depicted as part of the flow diagram. The language used in this disclosure has been principally selected for readability and instructional purposes, and may not have been selected to delineate or circumscribe the disclosed subject matter. Reference in this disclosure to "one embodiment" or to "an embodiment" means that a particular feature, structure, or characteristic described in connection with the embodiment is included in at least one embodiment, and multiple references to "one embodiment" or to "an embodiment" should not be understood as necessarily all referring to the same embodiment or to different embodiments.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

For purposes of this disclosure, the term "lens" refers to a lens assembly, which could include multiple lenses. In one or more embodiments, the lens may be moved to various positions to capture images with different points of focus. Further in one or more embodiments, the lens may refer to any kind of lens, such as a telescopic lens or a wide angle lens. As such, the term lens can mean a single optical element or multiple elements configured into a stack or other arrangement.

For purposes of this disclosure, the term "camera system" refers to one or more lens assemblies along with the one or more sensor elements and other circuitry utilized to capture an image. For purposes of this disclosure, the "camera" may include more than one camera system, such as a stereo camera system, multi-camera system, or a camera system capable of sensing the depth of the captured scene.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality. A virtual reality (VR) environment refers to a simulated environment that is designed to be based entirely on computer-generated sensory inputs for one or more senses, A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Referring to FIG. 1, a simplified block diagram of an electronic device 100 is depicted, in accordance with one or more embodiments of the disclosure. Electronic device 100 may be part of a multifunctional device, such as a mobile phone, tablet computer, personal digital assistant, portable music/video player, wearable device, base station, laptop computer, desktop computer, network device, or any other electronic device. FIG. 1 shows, in block diagram form, an overall view of a system diagram capable of providing touch detection using visual means. Although not shown, electronic device 100 may be connected to additional devices capable of providing similar or additional functionality across a network, a wired connection, a Bluetooth or other short range connection, among others.

Electronic Device 100 may include processor, such as a central processing unit (CPU) 120. Processor 120 may be a system-on-chip such as those found in mobile devices and include one or more dedicated graphics processing units (GPUs). Further processor 120 may include multiple processors of the same or different type. Electronic Device 100 may also include a memory 130. Memory 130 may each include one or more different types of memory, which may be used for performing device functions in conjunction with processor 120. For example, memory 130 may include cache, ROM, RAM, or any kind of transitory or non-transitory computer readable storage medium capable of storing computer readable code. Memory 130 may store various programming modules for execution by processor 120, including touch detection module 135. Electronic device 100 may also include storage 140. Storage 140 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Storage 140 may include historic touch data 145. It should be understood that according to one or more embodiments, the touch detection module 135 and the historic touch data 145 may be stored or hosted in different locations within electronic device 100. Further, in one or more embodiments, the touch detection module 135 and the historic touch data 145 may be stored in alternative or additional locations, such as network devices operatively connected to electronic device 100 across a network, as described above.

In one or more embodiments, electronic device 100 may include other components utilized for vision-based touch detection, such as one or more cameras 105 and/or other sensors such as depth sensors 110. In one or more embodiments, each of the one or more cameras 105 may be a traditional RGB camera, or a depth camera. Further, cameras 105 may include a stereo- or other multi-camera system, a time-of-flight camera system, or the like which capture images from which depth information of a scene may be determined.

In one or more embodiments, electronic device 100 may allow a user to interact with CGR environments. There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes.

In one or more embodiments, touch detection module 135 may determine an estimation of whether a touch event has occurred. A touch event may indicate a likelihood that contact has been made between a touching object (such as a finger or fingertip) and a surface. The touch detection module 135 may determine when a touch event occurs, for example, by obtaining depth information for a touching object and a surface. As an example, the touch detection module 135 may receive or obtain depth information from the camera 105, the depth sensor 110, or other sensor, and determine, based on the signal, an estimation that a touch event has occurred. In one or more embodiments, the estimation may be made based on a number of factors, such as by utilizing a predetermined model of a finger or other touching object, utilizing a predetermined or dynamically determined threshold estimation value for determining a touch, etc. Touch detection module 135 may also estimate a distance between a touching object and a surface.

In one or more embodiments, the touch detection module 135 utilizes historic information to determine a type of touch that has recently been detected in order to determine how to process the touch data. As described above, the historic touch data 145 may be stored in long-term or short-term memory. The historic touch data 145 may indicate a likelihood of a touch for a particular frame, according to one or more embodiments. In one or more embodiments, the touch detection module 135 may determine an initial touch type. That is, a touch type may be determined for a first set of frames prior to a particular filter being selected. In one or more embodiments, a default filter or no filter may be applied to the touch data from the initial frames.

Although electronic device 100 is depicted as comprising the numerous components described above, in one or more embodiments, the various components may be distributed across multiple devices. Particularly, in one or more embodiments, one or more of the touch detection module 135, and historic touch data 145 may be distributed differently across the electronic device 100 or elsewhere in additional systems which may be communicably coupled to the electronic device 100. Thus, the electronic device 100 may not be needed to perform one or more techniques described herein, according to one or more embodiments. Accordingly, although certain calls and transmissions are described herein with respect to the particular systems as depicted, in one or more embodiments, the various calls and transmissions may be made differently directed based on the differently distributed functionality. Further, additional components may be used, some combination of the functionality of any of the components may be combined.

Figure 2A:
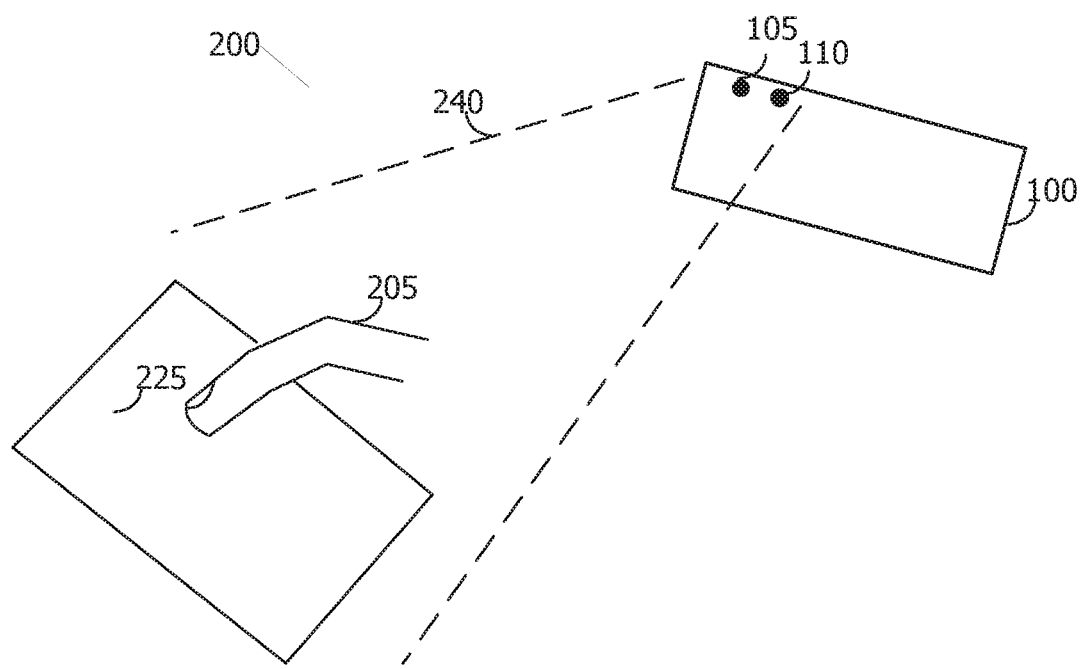
FIG. 2A shows, an example system setup in which touch may be detected, according to one or more embodiments.

FIG. 2A shows, an example system setup 200 in which touch may be detected, according to one or more embodiments. The system includes electronic device 100. Shown on electronic device 100 are camera 105 and/or depth sensor 110. In one or more embodiments, the electronic device (e.g., camera 105 of electronic device 100) captures an image of an environment including a touch surface 225 and a touching object 205. In order to determine a likelihood of a touch between the touching object 205 and the target surface 225, the touching object 205 and the target surface 225 may be captured by the camera 105 within a view area 240 of the camera 105. In one or more embodiments, the surface 225 may be any kind of surface on which the touch may be detected. The surface 225 may be a flat surface, or may be a curved or irregular surface. According to one or more embodiments, a model of the surface may be registered with the electronic device 100 such that depth information may be utilized to determine a likelihood of a touch based on depth or visual information. In alternative embodiments, the electronic device 100 may determine a likelihood of a touch between the touching object 205 and the surface 225 without relying on a model of the touching object.

Figure 2B:
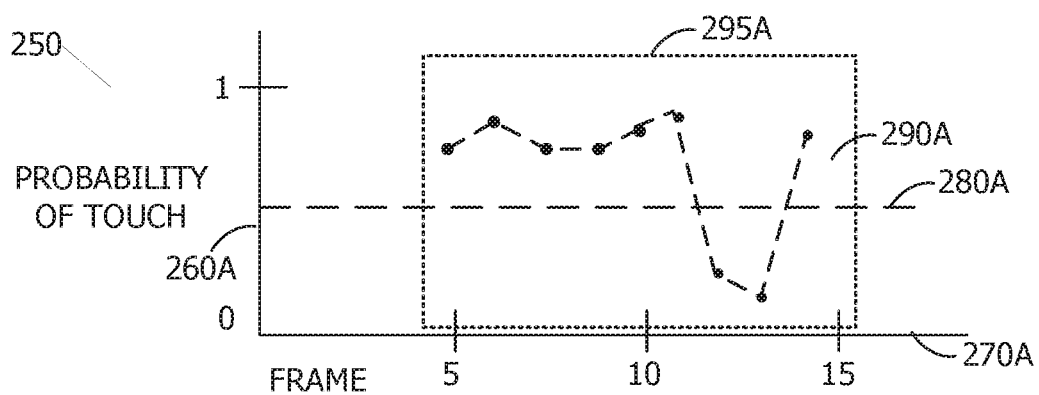
FIG. 2B shows example touch data obtained from a vision-based touch detection technique, according to one or more embodiments.
Figure 2B:
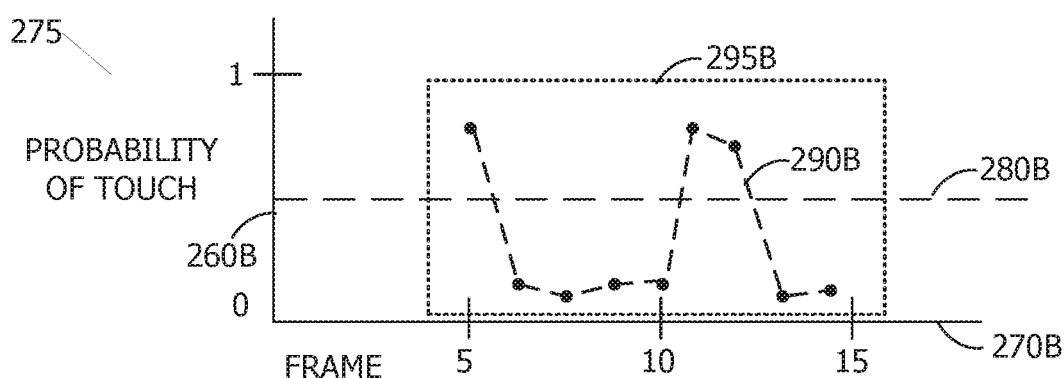

FIG. 2B shows example touch data obtained from a vision-based touch detection technique, according to one or more embodiments. Specifically, FIG. 2B shows two example probability charts, one for a dragging touch type, and one for a clicking touch type. According to one or more embodiments, raw touch data may include a probability of a touch for each frame. The probability may be determined based on depth information, such as that obtained from a stereocamera system, a depth sensor, a depth camera, a time-of-flight sensor, and the like.

The raw touch data, e.g. touch probability or hover distance, could be obtained by depth based touch detection. For example, depth images of a fingertip touching a real surface may be captured. In one or more embodiments, the touch detection module may first detect a fingertip position in a depth image and determine raw touch data for the fingertip based on a finger patch (for example, a portion of the image depicting the tip of the finger) containing depth pixels around the detected fingertip position. In one or more embodiments, determining raw touch data from the depth pixels includes first determining a surface based on RANSAC plane estimation, and estimating a distance to the determined plane for each pixel in the finger patch. Then distance regression may be performed to predict a hover distance. Alternatively, binary classification may be performed to predict a likelihood of a touch based on the finger patch of distances to the determined plane.

Probability chart 250 depicts a chart of a probability of a touch 260A for each frame 270A. As shown during time frame 295A, an estimation 290A for each frame is plotted form frames 5-15. Also depicted is a threshold probability 280A which is utilized to determine whether the frame should be considered a touch. That is, if a probability of a touch satisfies a predetermined threshold, then a touch is determined to have occurred in a particular frame. In one or more embodiments, the predetermined threshold 280A may be a predetermined value. In one or more embodiments, the probability threshold may be dynamically modified, for example based on learned behavior of a user (e.g., a user may benefit from a lower threshold or a higher threshold based on touch behavior). As another example, the probability threshold 280A may be dynamically modified based on a touch type. For example, as is described herein, a touch type may be determined for a series of frames. Thereafter, the probability threshold value may be modified based on an ongoing touch type. As an example, a click touch type may require or may benefit from a different touch threshold than a draft touch type. As shown, a touch is detected in frames 5-11, and then a touch is not detected in frames 12-13, and a touch is detected again at 14. As such, a drag touch type may be detected based on the sustained touch between frames 5-11.

In one embodiment, a touch event can be determined by applying a threshold to raw touch data (e.g. touch probability or hover distance) from one frame. The touch event may indicate the first frame of a series of frames in which the touching object is touching the surface. For example, in 295B, a touch event is detected at frame 11. A break touch event can be determined by applying another threshold on raw touch data (e.g., touch probability or hover distance) from one frame. The break touch event may indicate the last frame of a series in which the touch object is touching the surface. For example in FIG. 295B, a break touch event is detected at frame 12. A click action can be determined if the both the detected touch event and the break touch event are at the same position or positions within a predetermined distance. A drag action may be determined if the detected touch event and break touch events are detected at different positions. The positions of make touch and break touch events could be in the real surface coordinate, user coordinate system or any other coordinate system. The positions of make touch and break touch events may be detected by estimating fingertip positions in an image captured by a camera sensor. The velocity of fingertip could be computed based on position across different frames, which could be used to further distinguish between a drag action and a swipe action.

A click action may also be determined if the number of frames between the detected touch event and the break touch event is small. A drag action may also be determined if the number of frames between the detected touch event and break touch events is greater than a predetermined threshold.

Similarly, probability chart 275 depicts a chart of a probability of a touch 260B for each frame 270B. As shown during time frame 295B, an estimation 290B for each frame is plotted form frames 5-15. Also depicted is a threshold probability 280B which is utilized to determine whether the frame should be considered a touch. That is, if a probability of a touch satisfies a predetermined threshold, then a touch is determined to have occurred in a particular frame. As shown, a touch is detected at frame 5, then a touch detection is not detected at frames 6-10. Then, a touch may be detected again at frames 11-12, and then a touch is not detected at frames 13-14. As such, a click touch type may be detected based on the short number of consecutive frames indicating a touch is determined. The touch type may be determined based on a threshold number of frames indicating a touch (i.e., a drag). That threshold number may also change based on the velocity of a fingertip.

Figure 3:
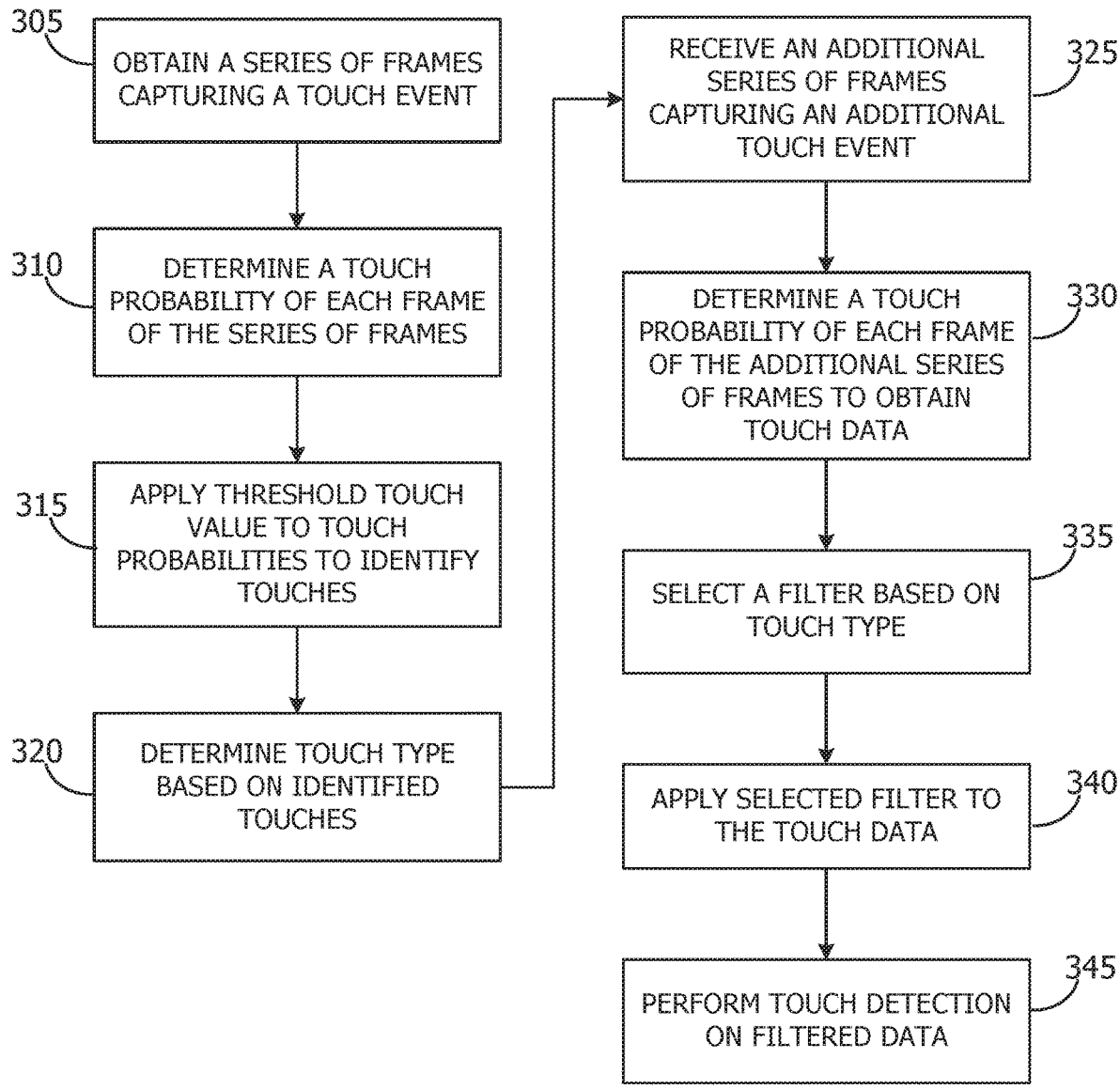
FIG. 3 shows, flow chart form, an example technique for temporally filtering touch data, in accordance with one or more embodiments.

FIG. 3 shows, flow chart form, an example technique for temporally filtering touch data, in accordance with one or more embodiments. For purposes of explanation, the following steps will be described in the context of FIG. 1. However, it should be understood that the various actions may be taken by alternate components. In addition, the various actions may be performed in a different order. Further, some actions may be performed simultaneously, and some may not be required, or others may be added.

The flowchart begins at 305 where the electronic device 100 obtains a series of frames capturing a touch event. As described above, the series of frames may contain depth information and/or image information from which depth information may be determined. The touch event may include a contact or a potential contact between a touching object and a surface. As such, the touch event may or may not include a touch and, according to one or more embodiments, the series of frames may simply capture a touching object, such as a finger, and a surface. That is the touching object may or may not actually be touching anything. Rather, the "touching" object may simply be the object for which a touch is estimated. In one or more embodiments, the number of frames in the series of frames may be a predetermined value, or may be modified, for example, based on user input, or may be modified dynamically, such as in a manner described below with respect to FIG. 4.

The flowchart continues at 310 where the touch detection module 135 determines a touch probability of each frame of the series of frames. In one or more embodiment, the touch probability comprises raw touch data from which a touch may be estimated. As an example, based on a determined depth of a touching object and a depth of a surface near the touching object. The touch detection module 135 may then determine an estimated probability of a touch based on the depth information.

At 315, the touch detection module 135 applies a threshold touch value to the touch probabilities to identify touches in the touch data. In one or more embodiments, the threshold value is applied to the probability data to label a frame as either a touch frame or not a touch frame. As an example, if a probability value for a frame is 70% likely to be a touch, and the threshold value is 50%, then the frame may be determined to be a touch frame. Similarly, if the threshold value is 80%, then the frame will be determined to not include a touch. In one or more embodiments, the threshold value may be predetermined, or many vary based on various parameters, such as touch type (e.g., the threshold value may be modified if a particular touch type is detected), human behavior (e.g., the threshold may be modified based on the behavior of the user utilizing the visual touch technique), context (e.g., the threshold may be modified based on contextual information that may affect the ability to detect a likelihood of a touch, such as environmental factors or factors related to the surface and/or the touch object).

At 320 where the touch detection module 135 determines a touch type based on the identified touches, as described above. The flowchart continues at 325 where the touch detection module 135 receives additional series of frames capturing an additional touch event. In one or more embodiments, the additional series of frames may also include a predetermined number of frames, or may be modified over time. That is, the additional series of frames may include the same number of frames as obtained at 305, or may include a different number of frames. Then, at 330 the touch detection module determines a touch probability of each frame of the additional series of frames to obtain touch data, similar to that described above with respect to 310.

At 335, the touch detection module selects a filter by which to process the touch data based on the determined touch type. In one or more embodiments, the type of filter may be a high pass filter or a low pass filter. A high pass filter may be utilized for a click touch type. In one or more embodiments, applying a high pass filter to a click touch type reduces the likelihood that click data will be lost as noise. Further, applying a low pass filter to a drag touch type removes the noise and provides a smoothing filter to the touch data. In one or more embodiments, the high pass filter may require more processing resources than a low pass filter. As such, reserving processing resources for click touch type actions may allow the touch detection module 135 to optimize or improve resource consumption of the electronic device 100. At 340, the selected filter is applied to the touch data. The flowchart concludes at 345 where the touch detection module performs touch detection on the processed data.

Figure 4:
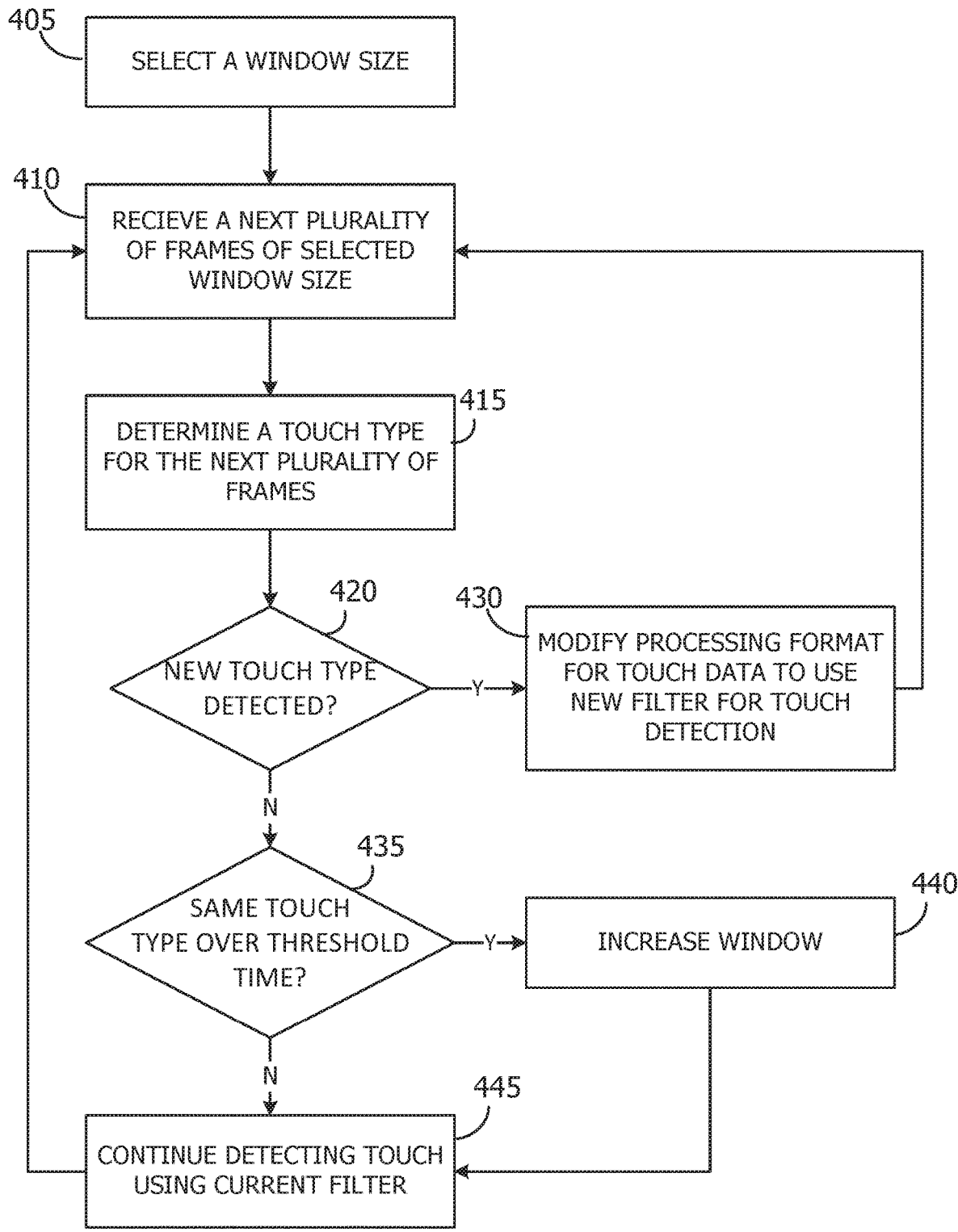
FIG. 4 shows, in flow chart form, an example technique for dynamically modifying a touch detection technique, according to one or more embodiments.

FIG. 4 shows, in flow chart form, an example technique for dynamically modifying a touch detection technique, according to one or more embodiments. In one or more embodiments, the performance of the touch detection may be optimized or improved by modifying the window of frames from which a touch type is determined, and therefore a filter is determined.

The flowchart begins at 405 where a window size is selected. The window size indicates a number of frames to be utilized to determine a click type. The window size may be any number of frames, such as 5 frames, 10 frames, or the like. In one or more embodiments, the window size may be selected as a default window size, or may be determined on other factors, such as prior touch data, contextual data, user preference, power savings, and the like.

The flowchart continues at 410 and the electronic device receives or obtains a next plurality of frames of the selected window size (e.g., the window size selected at 405). While the flowchart uses the term "next" plurality of frames, it could refer to an initial plurality of frames, according to one or more embodiments. In one or more embodiments, the plurality of frames comprise depth information or other information from which depth may be determined, and may capture a scene including a touching object 205 and a target surface 225.

At 415, the touch detection module 135 determines a touch type for the next plurality of frames. Note that the "next" plurality of frames here refers to the plurality of frames received at 410. As described above, a touch type may be a click touch type or a drag touch type, according to one or more embodiments, where a click indicates a tap by a touching object on a surface and a drag indicates a sustained movement by a touching object on a surface. The touch type may be determined in any number of ways, as described above.

At 420, a determination is made whether a new touch type is detected. That is, a determination is made regarding whether a different touch type is detected, from a touch type that was previously detected from a previous window (e.g. a previous set of frames), if one was previously detected. If at 420, a new touch type is detected, then the flowchart continues at 430 and the touch detection module 135 modifies the processing format for the touch data to use a new filter (e.g., the filter associated with the touch type) for touch detection. As described above, a high pass filter may be utilized for a click touch type, where a low pass filter may be used for a drag touch type. Then the flowchart continues at 410, and the next plurality of frames of the selected window size is received.

Returning to 420, if a determination is made that a new touch type is not detected, then the flowchart continues at 435 and a determination is made regarding whether the same touch type has been determined over a threshold time period or a threshold number of cycles. That is, if the same touch type is determined repeatedly over a determined period of time, or a number of cycles (e.g., a number of determinations of touch type), then the number of frames may increase. That is, in one or more embodiments, if a particular touch type is repeatedly identified, then the touch detection module 135 may increase the number of frames utilized to determine a touch type and, therefore, a filter type that should be used to process the raw touch data.

If at 435, a determination is made that the threshold time has been reached, then the flowchart continues at 440 and the window size is increased. That is, the number of frames used to detect a touch type is increased such that the touch type is determined over a longer period of time.

After the window is increased, or if at 435 a determination is made that the threshold time has not been met, then the flowchart continues at 445, where the touch detection module 135 continues to process the touch data using the current filter in order to detect a touch. The flowchart then returns to 410 and the next plurality of frames of the current window size is received. As such, the number of frames that is used to detect a touch type remains constant such that the touch type continues to be determined periodically.

Figure 5:
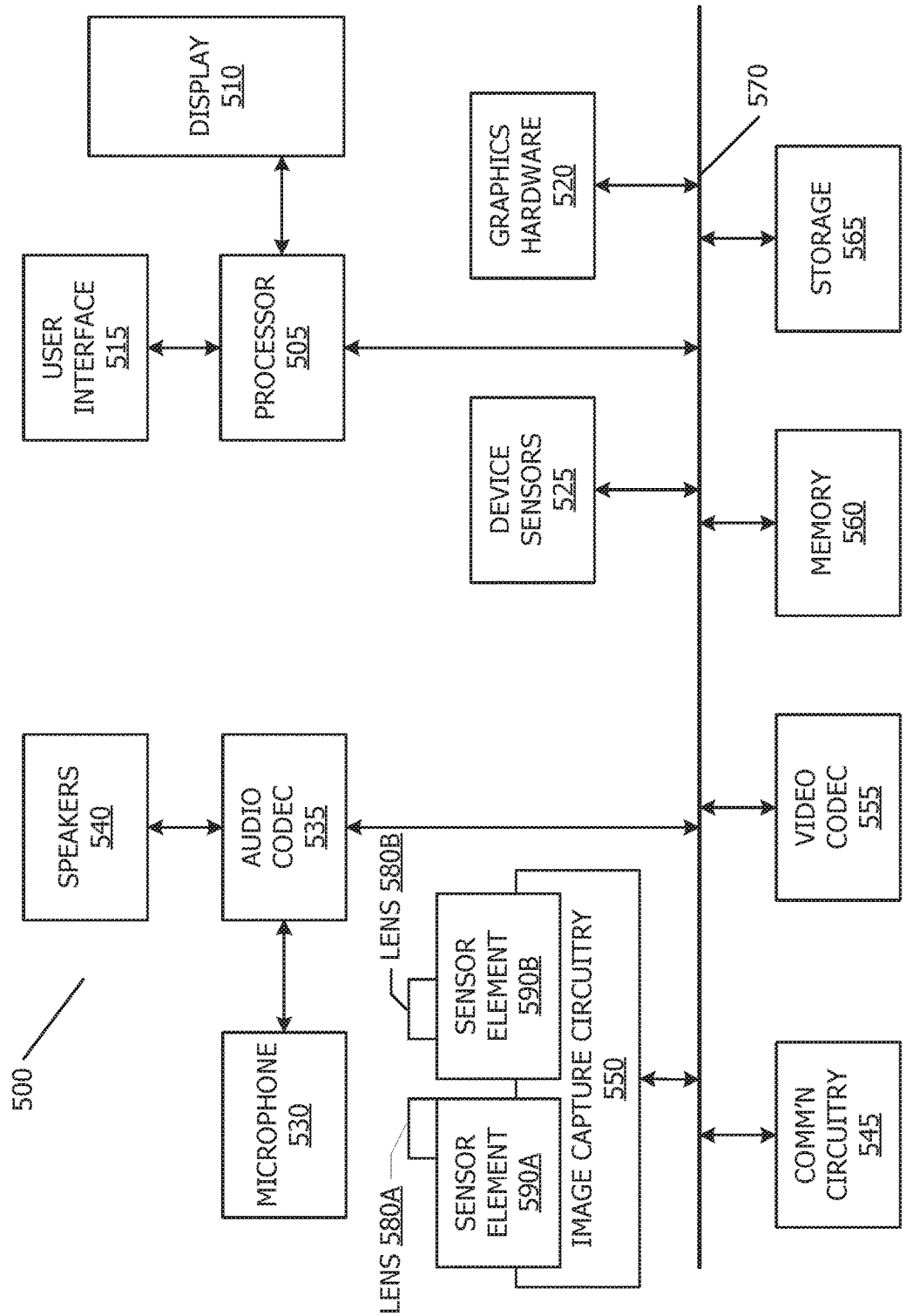
FIG. 5 shows, in block diagram form, a simplified multifunctional device according to one or more embodiments.

Referring now to FIG. 5, a simplified functional block diagram of illustrative multifunction electronic device 500 is shown according to one embodiment. Each of electronic device 100, first wearable device 150 and second wearable device 175 may be a multifunctional electronic device, or may have some or all of the described components of a multifunctional electronic device described herein. Multifunction electronic device 500 may include processor 505, display 510, user interface 515, graphics hardware 520, device sensors 525 (e.g., proximity sensor/ambient light sensor, accelerometer and/or gyroscope), microphone 530, audio codec(s) 535, speaker(s) 540, communications circuitry 545, digital image capture circuitry 550 (e.g., including camera system) video codec(s) 555 (e.g., in support of digital image capture unit), memory 560, storage device 565, and communications bus 570. Multifunction electronic device 500 may be, for example, a digital camera or a personal electronic device such as a personal digital assistant (PDA), personal music player, mobile telephone, or a tablet computer.

Processor 505 may execute instructions necessary to carry out or control the operation of many functions performed by device 500 (e.g., such as the generation and/or processing of images as disclosed herein). Processor 505 may, for instance, drive display 510 and receive user input from user interface 515. User interface 515 may allow a user to interact with device 500. For example, user interface 515 can take a variety of forms, such as a button, keypad, dial, a click wheel, keyboard, display screen and/or a touch screen. Processor 505 may also, for example, be a system-on-chip such as those found in mobile devices and include a dedicated graphics processing unit (GPU). Processor 505 may be based on reduced instruction-set computer (RISC) or complex instruction-set computer (CISC) architectures or any other suitable architecture and may include one or more processing cores. Graphics hardware 520 may be special purpose computational hardware for processing graphics and/or assisting processor 505 to process graphics information. In one embodiment, graphics hardware 520 may include a programmable GPU.

Image capture circuitry 550 may include two (or more) lens assemblies 580A and 580B, where each lens assembly may have a separate focal length. For example, lens assembly 580A may have a short focal length relative to the focal length of lens assembly 580B. Each lens assembly may have a separate associated sensor element 590. Alternatively, two or more lens assemblies may share a common sensor element. Image capture circuitry 550 may capture still and/or video images. Output from image capture circuitry 550 may be processed, at least in part, by video codec(s) 555 and/or processor 505 and/or graphics hardware 520, and/or a dedicated image processing unit or pipeline incorporated within circuitry 565. Images so captured may be stored in memory 560 and/or storage 565.

Sensor and camera circuitry 550 may capture still and video images that may be processed in accordance with this disclosure, at least in part, by video codec(s) 555 and/or processor 505 and/or graphics hardware 520, and/or a dedicated image processing unit incorporated within circuitry 550. Images so captured may be stored in memory 560 and/or storage 565. Memory 560 may include one or more different types of media used by processor 505 and graphics hardware 520 to perform device functions. For example, memory 560 may include memory cache, read-only memory (ROM), and/or random access memory (RAM). Storage 565 may store media (e.g., audio, image and video files), computer program instructions or software, preference information, device profile information, and any other suitable data. Storage 565 may include one more non-transitory computer-readable storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 560 and storage 565 may be used to tangibly retain computer program instructions or code organized into one or more modules and written in any desired computer programming language. When executed by, for example, processor 505 such computer program code may implement one or more of the methods described herein.

The scope of the disclosed subject matter should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory computer readable medium comprising computer readable code executable by one or more processors to:
   determine, from first raw touch data, an estimated touch type for a first plurality of frames;
   obtain second raw touch data comprising a probability that a touch has occurred for each of a second plurality of frames;
   select a filter based on the estimated touch type;
   apply the selected filter to the second raw data to obtain processed data;
   detect whether a touch has occurred for a particular frame based on the processed data.

2. The non-transitory computer readable medium of claim 1, wherein determining the estimated touch type comprises obtaining a probability that a touch has occurred for each of the first plurality of frames.

3. The non-transitory computer readable medium of claim 1, wherein the touch type comprises one selected from a group consisting of a click and a drag.

4. The non-transitory computer readable medium of claim 3, wherein the computer readable code to select the filter based on the estimated touch type comprises computer readable code to select a high pass filter if the determined estimated touch type is a click.

5. The non-transitory computer readable medium of claim 3, wherein the computer readable code to select the filter based on the estimated touch type comprises computer readable code to select a low pass filter if the determined estimated touch type is a drag.

6. The non-transitory computer readable medium of claim 1, further comprising computer readable code to select a threshold probability value based on the estimated touch type, wherein the computer readable code to detect whether a touch has occurred for a particular frame comprises determining that the processed data for the particular frame satisfies the selected threshold value.

7. The non-transitory computer readable medium of claim 1, wherein the touch type is associated with a touch event, and wherein the touch event occurs between a fingertip and a surface.

8. A system for detecting a touch, comprising:
   one or more processors; and
   one or more storage devices comprising computer readable code executable by the one or more processors to:
   determine, from first raw touch data, an estimated touch type for a first plurality of frames;
   obtain second raw touch data comprising a probability that a touch has occurred for each of a second plurality of frames;
   select a filter based on the estimated touch type;
   apply the selected filter to the second raw data to obtain processed data;
   detect whether a touch has occurred for a particular frame based on the processed data.

9. The system of claim 8, wherein determining the estimated touch type comprises obtaining a probability that a touch has occurred for each of the first plurality of frames.

10. The system of claim 8, wherein the touch type comprises one selected from a group consisting of a click and a drag.

11. The system of claim 10, wherein the computer readable code to select the filter based on the estimated touch type comprises computer readable code to select a high pass filter if the determined estimated touch type is a click.

12. The system of claim 10, wherein the computer readable code to select the filter based on the estimated touch type comprises computer readable code to select a low pass filter if the determined estimated touch type is a drag.

13. The system of claim 8, further comprising computer readable code to select a threshold probability value based on the estimated touch type, wherein the computer readable code to detect whether a touch has occurred for a particular frame comprises determining that the processed data for the particular frame satisfies the selected threshold value.

14. The system of claim 8, wherein the touch type is associated with a touch event, and wherein the touch event occurs between a fingertip and a surface.

15. A method for detecting a touch, comprising:
   determining, from first raw touch data, an estimated touch type for a first plurality of frames;
   obtaining second raw touch data comprising a probability that a touch has occurred for each of a second plurality of frames;
   selecting a filter based on the estimated touch type;
   applying the selected filter to the second raw data to obtain processed data;
   detecting whether a touch has occurred for a particular frame based on the processed data.

16. The method of claim 15, wherein determining the estimated touch type comprises obtaining a probability that a touch has occurred for each of the first plurality of frames.

17. The method of claim 15, wherein the touch type comprises one selected from a group consisting of a click and a drag.

18. The method of claim 17, wherein selecting the filter based on the estimated touch type comprises selecting a high pass filter if the determined estimated touch type is a click.

19. The method of claim 17, wherein selecting the filter based on the estimated touch type comprises selecting a low pass filter if the determined estimated touch type is a drag.

20. The method of claim 15, further comprising selecting a threshold probability value based on the estimated touch type, wherein detecting whether a touch has occurred for a particular frame comprises determining that the processed data for the particular frame satisfies the selected threshold value.

* * * * *